April 18, 1950     H. HOPP ET AL     2,504,331
MIRROR DISPLAY SIGN
Filed Dec. 6, 1944
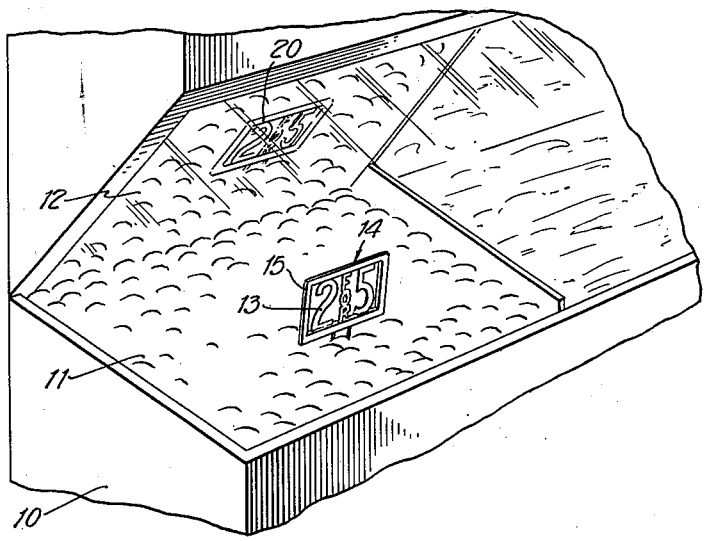
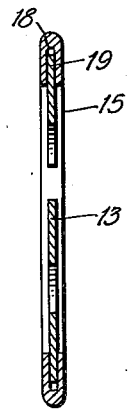
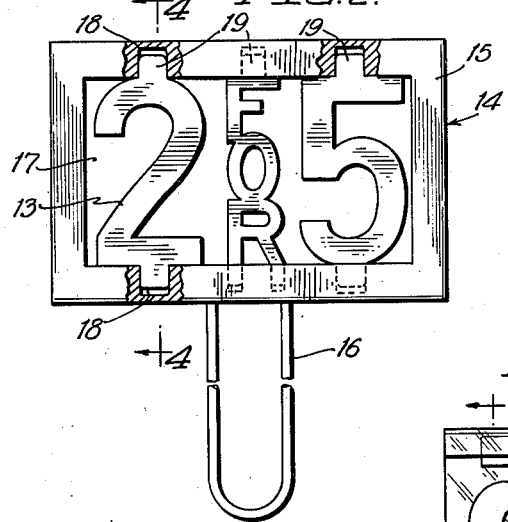
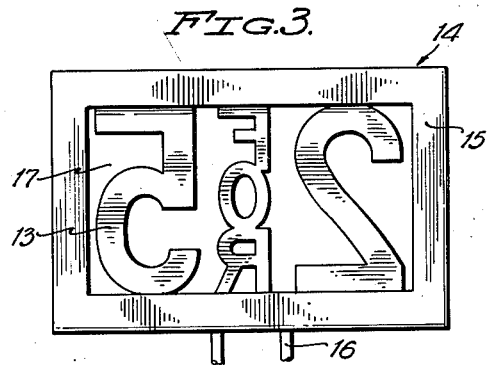
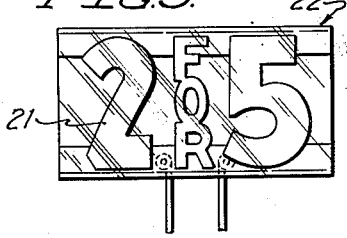
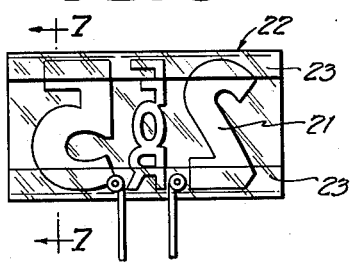
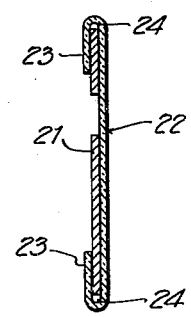
INVENTORS
HERMANN HOPP
PHILLIP HOPP
BY
Ely & Pattison
ATTORNEYS Patented Apr. 18, 1950

2,504,331

UNITED STATES PATENT OFFICE 2,504,331

MIRROR DISPLAY SIGN

Hermann Hopp and Philip Hopp, New York, N. Y., assignors of one-sixth to Selma Hopp and two-sixths to Harriet Gold, both of New York, one-sixth to George Hopp, Flushing, and one-sixth to Harry Hopp, and one-sixth to Helen Caplan, both of St. Albans, N. Y.

Application December 6, 1944, Serial No. 566,836

2 Claims. (Cl. 40—130.1)

This invention relates to price sign display device for use in connection with mirror reflected merchandise displays and which is an improvement over a price display sign set forth in the pending patent application of Leo Hopp, Serial No. 555,208, filed September 22, 1944, and now abandoned.

The present invention contemplates a display receptacle, bin or analogous structure for merchandise or commodities on display for sale, which has a mirror so arranged relative to the merchandise as to give by reflection the effect of twice the quantity of merchandise on display to an observer or prospective purchaser, and to present for observation appropriate sales indicia such as price, quantity, the name of the goods and the like, and the same indicia in the reflection thereof in the mirror.

One of the features of this invention resides in price marker characters which have edges conforming to the outline of the character to be depicted so that it is readable when viewed from the front and reverse when viewed from the rear, so as to be indirectly readable in a mirror disposed at the proper angle at the rear of the character, to the end that the identical formation may be seen at two different spaced points in proximity to the commodities being displayed for sale.

Another feature of the invention is to provide a price marker for mirror reflected displays in which the outline characters are supported either in an open frame or in a transparent holder to facilitate the reflection of the rear of the characters from the mirror when the price marker is in use.

Other novel features of the invention will become apparent as the following specification is read in conjunction with the accompanying drawing, in which, Figure 1 is a perspective view of a price marker constructed in accordance with one form of our invention and illustrating the same in use with a mirror reflected display.

Figure 2 is a front elevational view of the price marker shown in Figure 1 with parts broken away in section.

Figure 3 is a rear elevational view.

Figure 4 is a vertical transverse sectional view on the line 3—3 of Figure 2.

Figure 5 is a front elevational view of a modified form of our price marker.

Figure 6 is a rear elevational view of the price marker shown in Figure 5.

Figure 7 is a vertical transverse sectional view on the line 7—7 of Figure 5.

Referring to the drawing by reference characters, and at present to Figure 1 thereof, the numeral 10 designates a merchandise display structure in the form of an open top receptacle, bin, or the like adapted to contain and display the merchandise for sale. The articles of merchandise are designated 11.

It is the present modernistic practice for chain grocery and vegetable stores to impart to the merchandise display an effect of a larger quantity of merchandise on display than is in reality the case and which illusion is accomplished by a mirror 12 arranged in a fixed position of the rear of the display structure 10 and at a forward reflecting angle relative to the displayed merchandise.

Heretofore, it has been the practice to use a marker, card, or sign containing sales information, such as the price, name, etc. of the merchandise displayed for sale. Such a device is positioned at a conspicuous place or is placed on the receptacle or bin containing the commodity, or it is applied among the latter. This type of marker, card, or sign is blank at the rear, therefore the use of a reflecting mirror for the aforesaid purpose will reflect such blank surface in the general vertical effect and disturbs the illusion of the display.

In accordance with the present invention use is made of a marker, or sign, made up of one or a plurality of individual characters 13 which are in readable form when viewed from the front and in reverse form when viewed from the rear thereof so that when the rear side of the character is positioned relative to the reflecting surface of a mirror, the rear surface of the character will be reflected in readable form.

Each character 13 is constructed of a flexible opaque material such as Celluloid and a plurality thereof are interchangeably supported in display position within a holder 14. The holder 14 shown in Figures 1 to 4 inclusive comprises a frame or member 15 from which a stem 16 depends for insertion among the articles of merchandise when the marker is in use. While we have illustrated a holder in the form of a frame 15 having a window opening 17, we wish it to be understood that other forms of supporting the marker characters 13 for mirror reflection of the rear of the characters may be employed. The top and bottom rails of the frame 15 are provided with vertically alined sockets 18 to receive the top and bottom tongues 19—19 which extend beyond the corresponding ends of each character. The body of each character 13 is flexed to facilitate the insertion and removal of the tongues from the sockets 18.

In Figures 1, 2 and 3 we have shown for illustrative purpose a marker made up of a plurality of elements having the outline of characters or indications 13 which when viewed from the front, read "2 for 5" while when viewed from the rear, the said characters are in reverse readable order. However, when the marker is placed among the merchandise 11 as shown in Figure 1 so that the angle of incidence of the back face with respect to the mirror 12 will cause the characters 13 to appear in the mirror 12 as at 20 in Figure 1. Thus with a single marker device the identical sales indicia will be presented at different locations in proximity to the merchandise being displayed. The characters 13 forming the sales indicia will be readable directly in the usual manner and will be readable indirectly by virtue of the reflecting mirror 12.

In Figures 5 to 7 inclusive we have illustrated a modified form of our invention wherein sign forming characters 21 are supported in position within a transparent holder 22. The holder 22 is preferably made of transparent sheet plastic material having its top and bottom edges turned inwardly to form flanges 23—23 which are spaced from the rear face of the body of the holder to form parallel channels 24—24. The characters 21 are similar to the characters 13 except that the tongues 19 are omitted. The characters are inserted edgewise from the ends of the holder 22 and have their top and bottom edges seated in the channels 24. When the holder 22 and its supporting characters 21 are positioned among a display as shown in Figure 1, the rear faces of the characters are picked up by the mirror and reflected in readable form in the same manner as the marker shown in said figure.

If desired, sign forming characters 21 may be mounted in transparent moulding strips and the strips mounted along the top of the front wall of the bin 10.

Having thus described our invention, what we claim as new and desire to secure by Letters Patent is:

1. The combination with a mirror at the rear of a quantity of merchandise to reflect a view thereof forward, of a sales device supported upon the merchandise and including a frame member and opaque elements attached to said member and surrounded thereby and having the outline of indications relating to said merchandise, said frame having open spaces through and around said elements for the passage of light, said elements being arranged so that when seen on one side of said member they appear in the correct order for reading and when seen from the opposite side said elements appear in the reverse order for reading, said opposite side being presented to the mirror so that said elements are shown by said mirror in the correct order for reading, with the result that the visual effect upon the eye of the observer of said merchandise and said display device is increased.

2. The combination according to claim 1, wherein said member consists of an open frame surrounding said elements, and said elements are mounted in said frame by means of tongues carried by said members and inserted into sockets in said frame.

HERMANN HOPP.
PHILIP HOPP.

REFERENCES CITED

The following references are of record in the file of this patent:

UNITED STATES PATENTS

| Number | Name | Date |
|---|---|---|
| 193,006 | LaFrance | July 10, 1877 |
| 445,566 | Meitzler | Feb. 3, 1891 |
| 1,413,500 | Sommerville | Apr. 18, 1922 |
| 1,507,617 | McWilliam | Sept. 9, 1924 |
| 1,708,055 | Dellmuth | Apr. 9, 1929 |
| 1,887,591 | Frigita | Nov. 15, 1932 |
| 1,901,661 | MacCourt et al. | Mar. 14, 1933 |
| 1,982,131 | Acton | Nov. 27, 1934 |
| 2,039,248 | Huppert | Apr. 28, 1936 |
| 2,073,716 | Sunderhauf | Mar. 16, 1937 |
| 2,106,375 | Hemry | Jan. 25, 1938 |
| 2,406,743 | Crowson | Sept. 3, 1946 |

FOREIGN PATENTS

| Number | Country | Date |
|---|---|---|
| 657,702 | France | Jan. 16, 1929 |